Patented Oct. 26, 1937

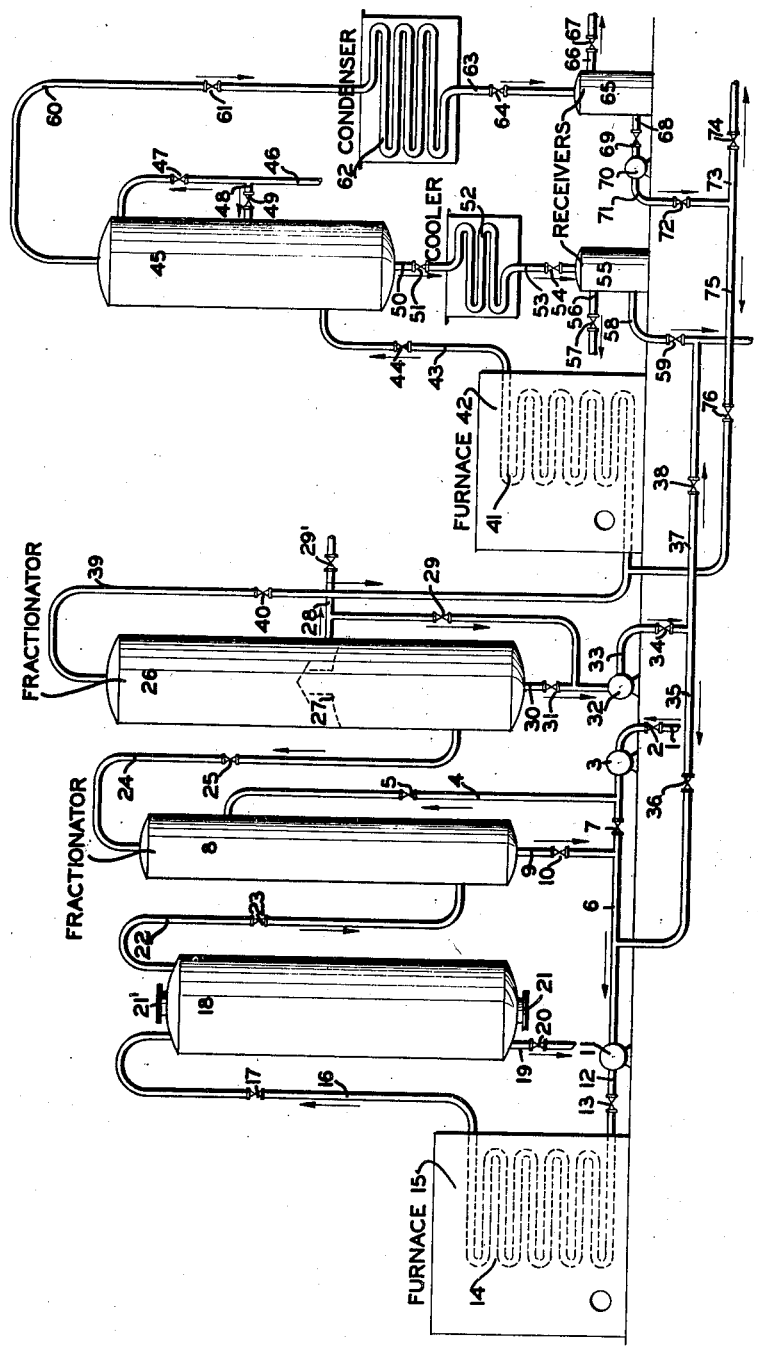

2,096,798

UNITED STATES PATENT OFFICE 2,096,798

TREATMENT OF HYDROCARBON OILS

Warren F. Faragher, Chicago, Ill., assignor, by mesne assignments, to Universal Oil Products Company, Chicago, Ill., a corporation of Delaware Application January 26, 1931, Serial No. 511,137

5 Claims. (Cl. 196—60)

This invention relates to the treatment of hydrocarbon oils and has more particular reference to the conversion of relatively high boiling hydrocarbon oils into lower boiling products of a more valuable nature.

More specifically, the invention contemplates the treatment of such high boiling hydrocarbon mixtures under elevated temperatures and pressures to produce therefrom large yields of lower boiling mixtures of a definite boiling range.

Processes involving the cracking of hydrocarbon oils have had for a long time as their primary object the production of low boiling hydrocarbon mixtures suitable for use as fuel in internal combustion engines, and to date such processes have produced, principally, fuels readily carbureted at atmospheric or slightly superatmospheric temperatures to produce homogeneous explosive mixtures for use in the cylinders of engines used in automobiles. It has long been recognized, both by the petroleum industry and by the makers of automotive engines, that the requirements which must be met by such fuels were severe, in that they must be extremely volatile as compared with the average volatility of the mixtures from which they were prepared, such as crude petroleum or the heavy portions thereof. Consequently, more or less concerted attempts have been made to produce a type of engine which would have the same flexibility as the present automobile engine and yet consume higher boiling and consequently cheaper fuel. The results of these efforts on the part of the engine builders has resulted in the development of engines of the Diesel type in which the fuel to be burned in the cylinders is injected into highly heated air at a point corresponding approximately to the end of the compression stroke, the necessity for complete vaporization being thereby eliminated, as well as the electrical discharge used in lower compression engines, since the conditions thus imposed upon the fuel causes its autoignition.

The present invention includes novel and useful features applicable to present cracking processes to enable the production of increased yields of oils of substantially less volatility than that of the hydrocarbon mixtures commonly employed as gasoline, but nevertheless efficiently utilizable in engines of the Diesel type, such as those designed for motor vehicles, aeroplanes and the like.

In one specific embodiment, the invention comprises heating heavy hydrocarbon oils under elevated temperatures and pressures, passing the heated materials to enlarged vaporizing or reaction zones, separating the vapors from nonvaporized residues, fractionating the reaction zone vapors in a primary fractionator during contact with a portion of the raw charging oil to produce vapors of approximately desired boiling point range and insufficiently converted refluxes which may be returned with the raw oil to the heating zone for further treatment; further fractionating vapors from the primary fractionator in a secondary fractionator to produce overhead vapors of lower boiling point range than that desired, together with refluxes of desired boiling point range; passing the lower boiling vapors through a secondary heating zone; contacting the heated vapors from the secondary heating zone with condensing agents to form material yields of heavier hydrocarbons of desired boiling point range which may be removed, cooled and stored, and vapors which may be cooled to condense liquids to be returned to the secondary heating zone for further heating and contact with such condensing agents.

Other and further objects and advantages of the invention will be apparent from the following description and accompanying diagrammatic drawing, illustrating a side-elevational view of one form of apparatus in which the invention may be carried out.

Referring to the drawing, heavy hydrocarbon oils, typified by residues and heavy distillates from the primary distillation of petroleum and heavy coal and shale oils and tars and the like, may be taken from line 1 by pump 3 through valve 2 and discharged either into line 4, controlled by valve 5, or line 6, controlled by valve 7. In the first event, line 4 may lead to a primary fractionator 8 in which initial segregation of cracked reaction zone vapors may be progressing, the cold raw oil assisting in the fractionation and being itself preheated. The heavier portions of the fractionated products and insufficiently converted reflux condensates and raw oil may pass from fractionator 8 through line 9, controlled by valve 10, to said line 6. If it be desired that fractionator 8 be by-passed, raw oil may be fed directly from pump 3 to line 6, or admixed with the products from fractionator 8 passing through line 9, by proper manipulation of valve 7 interposed in line 6, as stated. A portion or all of the reflux products from a secondary fractionator 26 may also be admitted to line 6 on the suction side of a pump 11, as will hereinafter more particularly appear. Pump 11 may discharge into a line 12, controlled by valve 13, leading to a heating element 14, suitably disposed within a furnace 15, adapted to impart to the oils passing through said heating element 14 a temperature sufficient to effect its conversion under any desired pressure. Heated products may be discharged from heating element 14 through line 16, controlled by valve 17, into an enlarged primary reaction zone 18, wherein said materials may be subjected to the desired time period of reaction.

The temperatures employed at the outlet of the heating element 14 may vary from 800 to 1050° F., more or less, while pressures employed in said heating element and enlarged reaction zone may be of the order of approximately 100 to 300 pounds per square inch, as the requirements of the process warrant,—the conditions of temperature and pressure imposed being dependent upon the type of charging stock and the degree of conversion desired. In general, the cracking conditions embodied in the primary heating zone 14 may be of a relatively mild character, tending to produce relatively large amounts of intermediate boiling fractions, for example, those boiling between the ranges of approximately 200 to 600° F. and being suitable for use in the lighter types of Diesel engines, such as may be employed as automotive power in automobiles and aeroplanes.

Liquid accumulations within chamber 18 may be withdrawn from the process or further converted alone or in admixture with the charging stock feed through a line 19, controlled by valve 20, while removable manheads 21 and 21' may be provided on said chamber through which ready access may be had to the interior thereof for clean-out purposes or otherwise. Vapors from reaction chamber 18 may pass through line 22, controlled by valve 23, to primary fractionator 8, wherein a rough separation may be effected of the entering vapors into reflux condensates amenable to further conversion, as previously described, and vapors which may contain substantial amounts of fractions boiling within the range of light Diesel fuel, together with vapors of lower boiling range typified by the relatively light portions of present commercial cracked gasolines.

The vapors evolved in said primary fractionator 8 may pass through line 24, controlled by valve 25, to a secondary fractionator 26 in which substantially complete segregation of desired intermediate boiling point fractions may be effected, with concurrent removal of components of lower boiling point as vapors. Reflux condensates from said secondary fractionator 26 may be discharged through line 30, controlled by valve 31, and an intermediate collecting pan 27 may be suitably disposed within said secondary fractionator from which suitable side-cuts to assist in controlling the quality of such condensates may be withdrawn through line 28, controlled by valve 29', from the system; or, as desired, such side-cuts collected in pan 27 may be commingled in any desired proportion with reflux condensate from said secondary fractionator by its passage through said line 28 and control valve 29 into said line 30. Pump 32 may take suction on the combined refluxes and sidecuts passing into line 30, and may discharge into line 33, controlled by valve 34, fractions of substantially desired boiling point range, although all or a portion of these liquids may be returned to primary heating element 14 through line 35, controlled by valve 36 in communication with feed line 6. When valve 38 in line 37 may be in the open position, the secondary fractionator bottoms, which may constitute the desired fuel fractions, may be sent to suitable storage (not shown).

Vapors from secondary fractionator 26 may be discharged through line 39, controlled by valve 40, into a secondary heating element 41, suitably disposed within a furnace 42, wherein said vapors may be subjected to a relatively more severe cracking condition in order to effect a high degree of unsaturation in the vapors. At the same time, lighter fractions than those desired may be introduced into said secondary heating element 41 through a line 75, controlled by valve 76. The highly heated, unsaturated vapors may be discharged from said secondary heating element through a line 43, controlled by valve 44, into a treating chamber 45, wherein polymerization and condensation reactions may be induced by the introduction of suitable chemical reagents, such as, for example, aluminum chloride or zinc chloride, causing the unsaturated compounds to unite among themselves to produce large amounts of liquids of increased boiling range. Suitable reagents to effect condensation may be introduced into said treating chamber at advantageous points through line 46, controlled by valve 47 and branch line 48, controlled by valve 49. The condensed or polymerized products of a boiling point range approximating that desired for the light engine fuel may be discharged from treating chamber 45 through line 50, controlled by valve 51, and pass to a cooler 52, after which the cooled liquid may pass through line 53, controlled by valve 54, into a primary receiver 55. Excess gas accumulations may be released to control pressure from said receiver through line 56, controlled by valve 57, and liquids of the desired boiling point range may be withdrawn from said receiver through line 58, controlled by valve 59, said latter line uniting with line 37 through which materials may be passing to storage from said secondary fractionator, as previously described. Suitable means (not shown) may also be provided for the removal of spent reagents accumulating either in treating chamber 45 or in receiver 55.

Temperatures maintained during the passage of the light vapors through said secondary heating element 41 may be of a relatively high order and as high as 1500° F. or higher, while pressures employed may be as high as 1000 pounds per square inch; such pressures being produced, if necessary, by compression of vapors in line 39 by suitable means (not shown).

Light vapors and fixed gases from treating chamber 45 may pass through line 60, controlled by valve 61, into a secondary condenser 62 in which partial liquefaction may be effected, the cooled products being discharged from said condenser through line 63 controlled by valve 64, to a seondary receiver 65, which may also be provided with a gas outlet 66, controlled by valve 67.

The liquid accumulations in receiver 65 may have a boiling range lower than that desired, and to enable their further transformation into heavier liquids of desired boiling point range, they may be returned to said secondary heating element 41 through line 68, controlled by valve 69, through pump 70, and into line 71, controlled by valve 72, communicating with line 75, controlled by valve 76, leading to said secondary heating element 41. The light liquid portions which may not be subjected to retreatment in said heating element 41, may be discharged from said line 71 into a line 73, controlled by valve 74, through which they may be passed to storage, or elsewhere.

From the foregoing, it is evident that a process has been disclosed which will admit of a wide variety of applications without departing from the scope of the invention.

As an example of the results obtainable from an adaptation of the principles of my invention, a 24 gravity Mid-Continent topped crude may be cracked at temperatures of approximately 930° F., under a pressure of about 250 pounds per square inch to produce about 75% of liquid products; the remainder being coke and substantially fixed gases. A yield of Diesel fuel of boiling points of approximately 200 to 600° F. up to 50% of said liquid may be obtained, making a yield from charging stock of about 37.5%. By suitable re-cracking and polymerizing of the lighter 50% of the liquid products from the first cracking operation, there will be converted to liquids of desired boiling point range up to amounts as high as 80%, which is equivalent to an additional yield of 30% based on raw oil charged to the process, thus giving a total over-all yield of about 67.5%. The temperatures employed in the secondary cracking zone, in such a case, may be of the order of 1000 to 1200° F., more or less, with pressures of approximately 100 pounds per square inch.

I claim as my invention:—

1. In a hydrocarbon oil cracking process of the character wherein the oil is subjected to cracking conditions of temperature and pressure, resultant cracked vapors separated from residue, and the vapors dephlegmated to condense heavier insufficiently cracked fractions thereof, the method which comprises passing light cracked vapors uncondensed by the dephlegmation to a vapor phase heating zone and heating the same therein to a temperature adequate to substantially increase the unsaturated content thereof, contacting the thus heated vapors with a polymerizing agent to produce therefrom a heavier hydrocarbon product boiling between 200° F. and 600° F. and suitable as Diesel engine fuel, and recovering the product thus produced.

2. A hydrocarbon oil cracking process which comprises subjecting the oil to cracking conditions of temperature and pressure in a cracking zone and separating the resultant cracked vapors from residue, dephlegmating the vapors to condense insufficiently cracked fractions thereof and returning resultant reflux condensate to the cracking zone for retreatment therein, further fractionating the dephlegmated vapors to obtain additional condensate and a relatively light cracked vapor, passing such light cracked vapor to a vapor phase heating zone maintained at higher temperature than the cracking zone and heating the same therein to a temperature adequate to substantially increase the unsaturated content thereof, contacting the thus heated vapors with a polymerizing agent to produce therefrom a heavier hydrocarbon product boiling between 200° F. and 600° F. and suitable as Diesel engine fuel, and recovering the product thus produced.

3. In a hydrocarbon oil cracking process of the character wherein the oil is subjected to cracking conditions of temperature and pressure, resultant cracked vapors separated from residue, and the vapors dephlegmated to condense heavier insufficiently cracked fractions thereof, the method which comprises passing light cracked vapors uncondensed by the dephelgmation to a vapor phase heating zone and heating the same therein to a temperature adequate to substantially increase the unsaturated content thereof, contacting the thus heated vapors with a polymerizing agent to produce therefrom a heavier hydrocarbon product boiling between 200° F. and 600° F. and suitable as Diesel engine fuel, separating said product from hydrocarbons of lower boiling point, and recycling such hydrocarbons of lower boiling point to the vapor phase heating zone and into contact with the polymerizing agent for additional production of Diesel engine fuel.

4. A process for treating light gasoline-containing vapors which comprises superheating the vapors to a temperature sufficient to increase the unsaturated content thereof, then contacting the vapors at such temperature with a polymerizing agent, and condensing the thus treated vapors.

5. A process for treating the vaporous gasoline-containing mixture produced in the cracking of hydrocarbon oils which comprises fractionating the mixture to condense and separate fractions thereof heavier than gasoline while retaining the gasoline in vapor form, superheating the gasoline vapors to a temperature sufficient to increase the unsaturated content thereof, then contacting the vapors at such temperature with a polymerizing agent, and condensing the thus treated vapors.

WARREN F. FARAGHER.